(12) United States Patent
Kumar et al.

(10) Patent No.: US 12,554,583 B2
(45) Date of Patent: Feb. 17, 2026

(54) SYSTEMS AND METHODS FOR APPLICATION FAILOVER MANAGEMENT USING A DISTRIBUTED DIRECTOR AND PROBE SYSTEM

(71) Applicant: Fidelity Information Services, LLC, Jacksonville, FL (US)

(72) Inventors: Pankaj Kumar, Jacksonville, FL (US); Aravind Manchireddy, St Johns, FL (US); Rarish Ravi, Round Rock, TX (US)

(73) Assignee: FIDELITY INFORMATION SERVICES, LLC, Jacksonville, FL (US)

( * ) Notice: Subject to any disclaimer, the term of this patent is extended or adjusted under 35 U.S.C. 154(b) by 50 days.

(21) Appl. No.: 17/351,657

(22) Filed: Jun. 18, 2021

(65) Prior Publication Data

US 2022/0405170 A1 Dec. 22, 2022

(51) Int. Cl.
*G06F 11/14* (2006.01)
*G06F 3/0482* (2013.01)
*G06F 3/04847* (2022.01)

(52) U.S. Cl.
CPC ........ *G06F 11/1415* (2013.01); *G06F 3/0482* (2013.01); *G06F 3/04847* (2013.01); *G06F 2201/81* (2013.01)

(58) Field of Classification Search
CPC .............. G06F 11/1415; G06F 3/0482; G06F 3/04847; G06F 2201/81
See application file for complete search history.

(56) References Cited

U.S. PATENT DOCUMENTS

| 7,971,094 | B1 * | 6/2011 | Benn ................... | G06F 11/2025 714/13 |
| 11,347,601 | B1 * | 5/2022 | Nachiappan ........ | G06F 11/3006 |
| 2010/0042673 | A1 * | 2/2010 | Dayley ............... | G06F 11/2028 709/203 |
| 2014/0047088 | A1 * | 2/2014 | Dain ...................... | H04L 67/59 709/223 |
| 2015/0339200 | A1 * | 11/2015 | Madduri ............. | G06F 11/1425 714/4.11 |

(Continued)

*Primary Examiner* — Reji Kartholy
(74) *Attorney, Agent, or Firm* — Finnegan, Henderson, Farabow, Garrett & Dunner, LLP

(57) ABSTRACT

Systems and methods for application management are disclosed. The system may include a probe system and one or more director systems, each comprising at least one memory and one or more processors configured to execute instructions. The instructions may include monitoring an availability of an application; updating a status associated with the availability of the application in a first data store; polling the first data store in intervals to retrieve the status associated with the availability of the application; upon retrieving at least a consecutive predetermined number of statuses associated with the application being unavailable, determining the application is unavailable; determining whether at least one other director system of the one or more director systems has determined the application is unavailable; and upon determining the at least one other director system of the one or more director systems has determined the application is unavailable, triggering a failover process.

16 Claims, 8 Drawing Sheets

(56) References Cited

U.S. PATENT DOCUMENTS

| | | | | |
|---|---|---|---|---|
| 2016/0092322 A1* | 3/2016 | Nosov | ............... | G06F 11/2007 |
| | | | | 714/4.11 |
| 2018/0091413 A1* | 3/2018 | Richards | ............... | H04L 43/20 |
| 2018/0173734 A1* | 6/2018 | Kripalani | ............... | G06F 11/00 |
| 2019/0340060 A1* | 11/2019 | Nijhawan | ........... | G06F 11/0754 |
| 2020/0349036 A1* | 11/2020 | Sathavalli | ........... | G06F 11/0727 |
| 2022/0255822 A1* | 8/2022 | Yousouf | ............. | H04L 43/0811 |
| 2022/0261321 A1* | 8/2022 | Zakharkin | ........... | G06F 11/2092 |

* cited by examiner

| Platforms 406a | Primary Director 406b | Secondary Director 406c | Maintenance Skip AutoFailover 406d | Status 406e | Enable AutoFailover 406f | Alert 406g | Failover Options 406h |
|---|---|---|---|---|---|---|---|
| Services | | | | | | | |
| Application A | X | Y | Sunday 02:00 – 06:00 | UP | ◯ | ■ | X  Y |
| Application B | X | Z | Sunday 02:00 – 06:00 | UP | ◯ | □ | X  Z |
| Application C | Y | X | Sunday 02:00 – 06:00 | UP | ◯ | ■ | Y  X |
| Application D | Y | Z | Sunday 02:00 – 06:00 | DOWN | ◯ | ■ | Y  Z |
| Application E | Z | Y | Sunday 02:00 – 06:00 | DOWN | ◯ | ■ | Z  Y |
| Application F | X | Z | Sunday 02:00 – 06:00 | DOWN | ◯ | □ | X  Z |
| Application G | X | Z | Sunday 02:00 – 06:00 | DOWN | ◯ | □ | X  Z |

FIG. 4

SYSTEMS AND METHODS FOR APPLICATION FAILOVER MANAGEMENT USING A DISTRIBUTED DIRECTOR AND PROBE SYSTEM

TECHNICAL FIELD

The present disclosure generally relates to computerized systems and methods for application management. In particular, embodiments of the present disclosure relate to inventive and unconventional systems that maximize resilience of applications and reaction time and flexibility of failover processes by employing a distributed director and probe system to monitor and automatically trigger a failover in the event of an unhealthy application.

BACKGROUND

Conventional failover systems and methods often require vast technical expertise to operate, and are inflexible and inconvenient. Usually, conventional failover processes do not allow a user to modify any part of the failover process unless the user can modify the code itself. Further, these systems may be too simple for complex systems, such as banking systems or financial systems, which require systems with high availability. In particular, conventional failover systems may take actions which cause applications to undergo redundant failover processes and be unavailable for some period of time, negatively impacting customer experience. For example, a system which iteratively checks the health of an application and performs a failover process immediately upon registering a moment of unhealthiness may be operating with incomplete data. For instance, the issue may not be in the application, but in the system itself, causing the application to undergo failover for no reason. On the other hand, systems which attempt to correct this by engaging a human operator may cause the reaction time for responding to a genuinely unhealthy application to increase dramatically.

Additionally, conventional failover systems are specific to each application and must be set up individually at great financial and time cost, rendering these systems inconvenient and many times incompatible between applications.

Therefore, in view of the shortcomings and problems with existing methods, there is a need for improved systems and methods that employ application failover management that can be used for a plurality of applications. Such unconventional systems will improve resilience, reaction time, flexibility, convenience, decrease cost, and increase compatibility.

SUMMARY

One aspect of the present disclosure is directed to a computer-implemented system for application management. For example, certain embodiments may include a probe system comprising at least one memory storing instructions and one or more processors configured to execute the instructions to monitor an availability of an application and update a status associated with the availability of the application in a first data store. Additional embodiments may include one or more director systems comprising at least one memory storing instructions and one or more processors configured to execute the instructions to poll the first data store in intervals to retrieve the status associated with the availability of the application at different times; upon retrieving at least a particular number of consecutive statuses associated with the application being unavailable, determine the application is unavailable; determine whether at least one other director system of the one or more director systems has determined the application is unavailable; and upon determining the at least one other director system of the one or more director systems has determined the application is unavailable, trigger a failover process.

Another aspect of the present disclosure is directed to a computer-implemented method for application management. For example, certain embodiments of the method may include monitoring an availability of an application; updating a status associated with the availability of the application in a first data store; polling the first data store in intervals to retrieve the status associated with the availability of the application at different times; upon retrieving at least a particular number of consecutive statuses associated with the application being unavailable, determining the application is unavailable; determining whether at least one director system of associated one or more director systems has determined the application is unavailable; and upon determining the at least one director system of the associated one or more director systems has determined the application is unavailable, triggering a failover process.

Yet another aspect of the present disclosure is directed to a computer-implemented system for application management. For example, certain embodiments may include a probe system comprising at least one memory storing instructions and one or more processors configured to execute the instructions to monitor an availability of an application and update a status associated with the availability of the application in a first data store. Additional embodiments may include one or more secondary director systems comprising at least one memory storing instructions and one or more processors configured to execute the instructions to poll the first data store in intervals to retrieve the status associated with the availability of the application at different times and upon retrieving at least a particular number of consecutive statuses associated with the application being unavailable, determine the application is unavailable. Additional embodiments may include a primary director system comprising at least one memory storing instructions and one or more processors configured to execute the instructions to poll the first data store in intervals to retrieve the status associated with the availability of the application at different times, upon retrieving the at least the particular number of consecutive statuses associated with the application being unavailable, determine the application is unavailable, determine whether at least one secondary director system of the one or more secondary director systems has determined the application is unavailable, and upon determining the at least one secondary director system of the one or more secondary director systems has determined the application is unavailable, trigger a failover process.

Consistent with other disclosed embodiments, non-transitory computer readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 4 is a diagram of a user interface for managing one or more applications, consistent with disclosed embodiments.

DETAILED DESCRIPTION OF THE EMBODIMENTS

Disclosed embodiments include systems and methods for application management using a distributed configuration of director systems and probe systems to improve upon the resilience, reaction time, flexibility, convenience, and compatibility of conventional failover processes. The disclosed improved failover processes may be performed to allow a user to manage the failover processes for a plurality of applications from one convenient user interface, determine whether to enable a failover feature for each application, manually trigger a failover process, determine which components of each application stack to engage in failover processes, view an audit trail indicating the failover history for the plurality of applications, receive alerts regarding applications and/or associated director systems, set maintenance times for each application where a failover process must not be triggered, and more, as discussed herein. The disclosed embodiments improve upon the technical process of failover processes as they engage a novel distributed director and probe system which operates to improve the resilience and reaction time of failover processes.

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
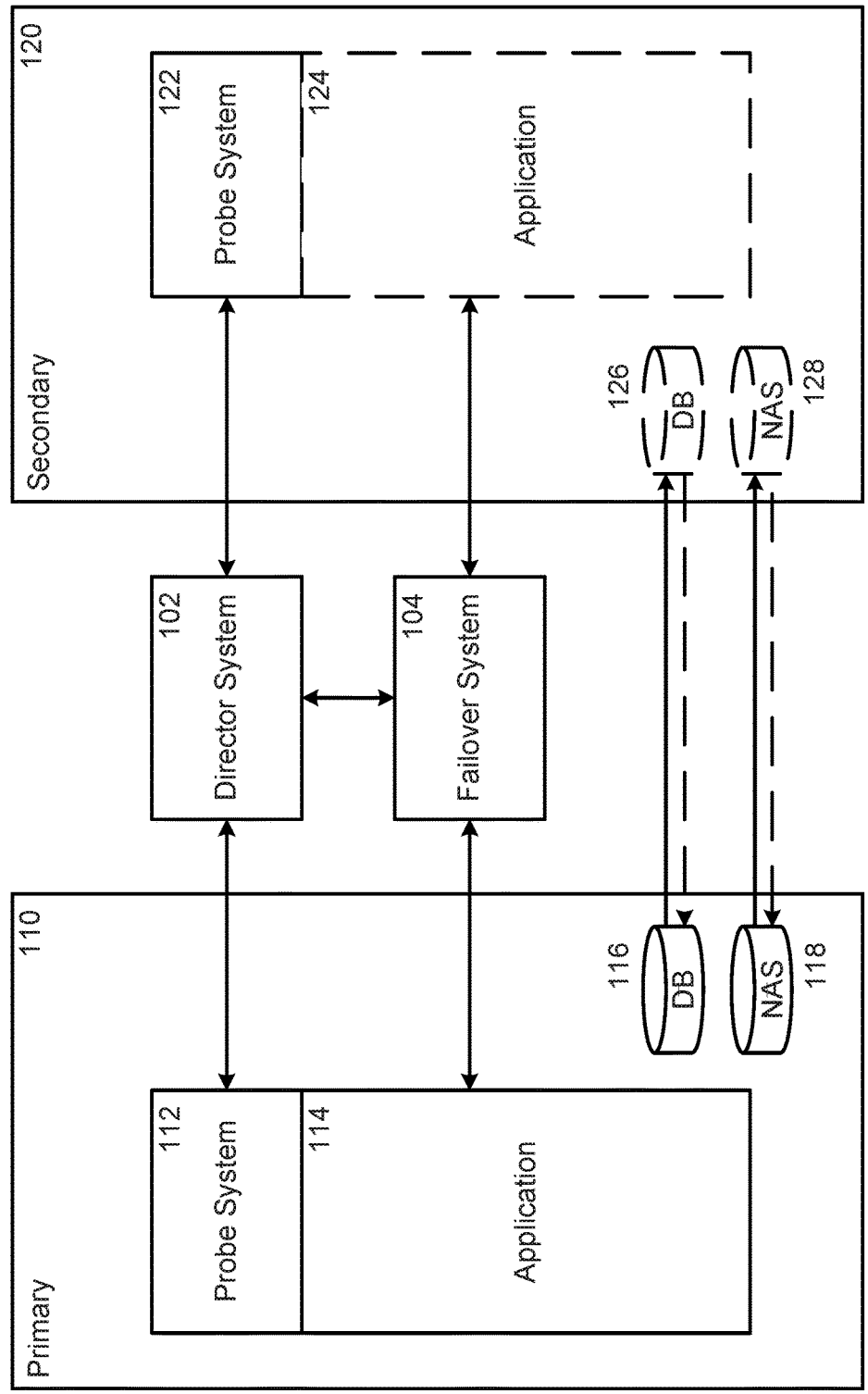
FIG. 1 is a diagram of an exemplary system for application management, consistent with disclosed embodiments.

FIG. 1 is a diagram of an exemplary system 100 for managing an application 114, consistent with disclosed embodiments. System 100 may include a director system 102, a failover system 104, a primary local network 110, a primary probe system 112, a primary application 114, a primary database (DB) 116, a primary network-attached storage (NAS) 118, a secondary local network 120, a secondary probe system 122, a secondary application 124, a secondary DB 126, and a secondary NAS 128. Throughout this disclosure, primary local network 110 and secondary local network 120 may be simply referred to as local networks 110 and 120; primary probe system 112 and secondary probe system 122 may be simply referred to as probe systems 112 and 122; primary application 114 and secondary application 124 may be simply referred to as applications 114 and 124; primary DB 116 and secondary DB 126 may be simply referred to as DBs 116 and 126; and primary NAS 118 and secondary NAS 128 may be simply referred to as NASs 118 and 128. In some embodiments, local networks 110 and 120 may be the same network and probe systems 112 and 122 may be the same probe system.

Components of system 100 may be connected to each other through a network (not shown) such as a Wide Area Network (WAN) or a Local Area Network (LAN). As shown in FIG. 1, director system 102 may be directly connected to probe systems 112 and 122 and to failover system 104; failover system 104 may be directly connected to director system 102 and applications 114 and 124; primary DB 116 may be directly connected to secondary DB 126; and primary NAS 118 may be directly connected to secondary NAS 128.

As will be appreciated by one skilled in the art, the components of system 100 may be arranged in various ways and implemented with any suitable combination of hardware, firmware, and/or software, as applicable. For example, as compared to the depiction in FIG. 1, system 100 may include a larger or smaller number of director systems, failover systems, probe systems, applications, databases, network-attached storages, or networks. In addition, system 100 may further include other components or devices not depicted that perform or assist in the performance of one or more processes, consistent with the disclosed embodiments. The exemplary components and arrangements shown in FIG. 1 are not intended to limit the disclosed embodiments.

Director system 102 may include one or more memory units and one or more processors configured to perform operations consistent with disclosed embodiments. In some embodiments, director system 102 may include hardware, software, and/or firmware modules. In some embodiments, some or all components of director system 102 may be hosted on one or more servers, one or more clusters of servers, or one or more cloud services (e.g., cloud services hosted by Akamai, Microsoft, Amazon, Oracle, Google, Apache, or any other appropriate cloud service). Director system 102 may be connected to one or more networks and/or may be connected directly to probe systems 112 and 122 and failover system 104. Director system 102 may be configured to make a plurality of determinations, and based on those determinations, trigger a failover process. Director system 102 is described in greater detail below with reference to FIGS. 2 and 6.

Failover system 104 may include one or more memory units and one or more processors configured to perform operations consistent with disclosed embodiments. In some embodiments, failover system 104 may include hardware, software, and/or firmware modules. In some embodiments, some or all components of failover system 104 may be hosted on one or more servers, one or more clusters of servers, or one or more cloud services (e.g., cloud services hosted by Akamai, Microsoft, Amazon, Oracle, Google, Apache, or any other appropriate cloud service). Failover system 104 may be connected to one or more networks and/or may be connected directly to applications 114 and 124 and director system 102. Failover system 104 may be configured to perform a failover process automatically or upon receiving a trigger, such as from director system 102. Failover system 104 is described in greater detail below with reference to FIGS. 3 and 7.

As shown in FIG. 1, at least one of primary probe system 112, primary application 114, primary DB 116, and primary NAS 118 may connect to primary local network 110, and at least one of secondary probe system 122, secondary application 124, secondary DB 126, and secondary NAS 128 may connect to secondary local network 120. Local networks 110 and 120 may be public networks or private networks and may each include, for example, a wired or wireless network, including, without limitation, a Local Area Network, a Wide Area Network, a Metropolitan Area Network, an IEEE 802.11 wireless network (e.g., "Wi-Fi"), a network of networks (e.g., the Internet), a land-line telephone network, or the like. In some embodiments, local networks 110 and 120 may be secure networks and require a password or other authentication criterion to access the networks.

Probe systems 112 and 122 may each include one or more memory units and one or more processors configured to perform operations consistent with disclosed embodiments. In some embodiments, probe systems 112 and 122 may include hardware, software, and/or firmware modules. In some embodiments, some or all components of probe systems 112 and 122 may be hosted on one or more servers, one or more clusters of servers, or one or more cloud services (e.g., cloud services hosted by Akamai, Microsoft, Amazon, Oracle, Google, Apache, or any other appropriate cloud service). Probe systems 112 and 122 may be configured to send requests or run queries against one of applications 114 and 124, DBs 116 and 126, or NASs 118 and 128 to determine whether applications 114 and 124 are available. For example, primary probe system 112 may run a query against primary DB 116 to determine that primary application 114 is available, and thus may be associated with a status of 'UP.' As another example, secondary probe system 122 may run a query against secondary DB 126 to determine that secondary application 124 is unavailable, and thus may be associated with a status of 'DOWN.' Probe systems 112 and 122 may be connected to one or more networks and/or may be connected directly to director system 102, applications 114 and 124, DBs 116 and 126, and NASs 118 and 128. Probe systems 112 and 122 are described in greater detail below with reference to FIG. 5.

Applications 114 and 124 may include programs or pieces of software (e.g., modules, code, scripts, or functions) designed and written to process data and perform a particular task or set of tasks to fulfill a particular purpose for a user. For example, applications 114 and 124 may be configured to manage a bank account of a user. Applications 114 and 124 may be configured to perform a task in response to a triggering event. For example, in response to a triggering event such as the receipt of input data from one component of system 100, from a user, or from any other entity, applications 114 and 124 may be configured to process the input data and forward processed data to another system 100 component. Applications 114 may be connected to one or more networks and/or may be connected directly to failover system 104, probe systems 112 and 122, DBs 116 and 126, and NASs 118 and 128. Applications 114 and 124 may be configured to perform similar tasks.

DBs 116 and 126 may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, DBs 116 and 126 may each include an array, an associative array, a linked list, a binary tree, a balanced tree, a heap, a stack, a queue, a set, a hash table, a record, a tagged union, ER model, or a graph. For example, DBs 116 and 126 may each include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, or Neo4J. DBs 116 and 126 may be components of system 100 or remote computing components (e.g., cloud-based data structures). Data in DBs 116 and 126 may be stored in contiguous or non-contiguous memory. Moreover, DBs 116 and 126 do not require information to be co-located. DBs 116 and 126 may be distributed across multiple servers, for example, that may be owned or operated by the same or different entities. Thus, the terms "database" or "data structure" as used herein in the singular are inclusive of plural databases or data structures. DBs 116 and 126 may be configured to contain the same or similar data.

DBs 116 and 126 may be connected to one or more networks and/or may be connected directly to each other, probe systems 112 and 122, applications 114 and 124, and NASs 118 and 128. In some embodiments, primary DB 116 may be active and may replicate its data onto secondary DB 126 by any appropriate process, such as by replicating data between heterogeneous databases. In such embodiments, one or more components of system 100 (e.g., director system 102, failover system 104, or applications 114 and 124) may ensure that secondary DB 126 contains an up-to-date copy of the data in primary DB 116. Additionally or alternatively, in other embodiments, secondary DB 126 may be active and may replicate its data onto primary DB 116 by any appropriate process.

NASs 118 and 128 may include any data storage server connected to one or more networks, such as local networks 110 and 120. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, NASs 118 and 128 may each include an array, an associative array, a linked list, a binary tree, a balanced tree, a heap, a stack, a queue, a set, a hash table, a record, a tagged union, ER model, and a graph. For example, NASs 118 and 128 may each include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, or Neo4J. NASs 118 and 128 may be components of system 100 or remote computing components (e.g., cloud-based data structures). Data in NASs 118 and 128 may be stored in contiguous or non-contiguous memory. Moreover, NASs 118 and 128 do not require information to be co-located. NASs 118 and 128 may be distributed across multiple servers, for example, that may be owned or operated by the same or different entities. NASs 118 and 128 may be configured to contain the same or similar data.

NASs 118 and 128 may be connected to one or more networks and/or may be connected directly to each other, probe systems 112 and 122, applications 114 and 124, and DBs 116 and 126. In some embodiments, primary NAS 118 may be active and may replicate its data onto secondary NAS 128 by any appropriate process, such as snapshot replication. In such embodiments, one or more components of system 100 (e.g., director system 102, failover system 104, or applications 114 and 124) may ensure that secondary NAS 128 contains an up-to-date copy of the data in primary NAS 118. Additionally or alternatively, in other embodiments, secondary NAS 128 may be active and may replicate its data onto primary NAS 118 by any appropriate process.

Figure 2:
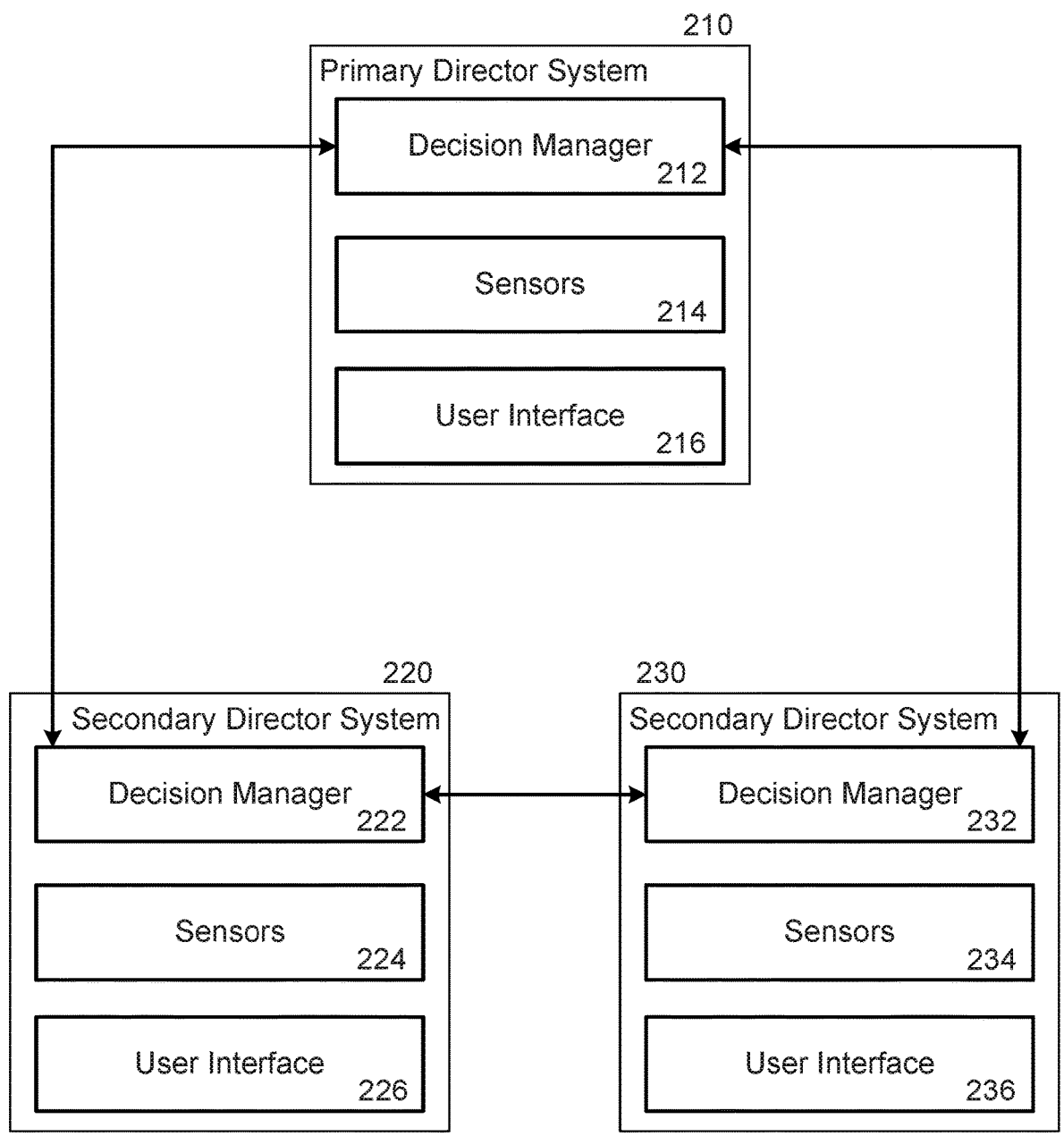
FIG. 2 is a diagram of an exemplary director cluster, consistent with disclosed embodiments.

FIG. 2 is a diagram of an exemplary director cluster 200, consistent with disclosed embodiments. Director cluster 200 may include a primary director system 210, a primary decision manager 212, primary sensors 214, a primary user interface 216, a first secondary director system 220, a first secondary decision manager 222, first secondary sensors 224, a first secondary user interface 226, a second secondary director system 230, a second secondary decision manager 232, second secondary sensors 234, and a second secondary user interface 236. Throughout this disclosure, first and second secondary director systems 220 and 230 may be simply referred to as secondary director systems 220 and 230; first and second secondary decision managers 222 and 232 may be simply referred to as secondary decision managers 222 and 232; first and second secondary sensors 224 and 234 may be simply referred to as secondary sensors 224 and 234; and first and second secondary user interfaces 226 and 236 may be simply referred to as secondary user interfaces 226 and 236.

In some embodiments, director cluster 200 may include only primary director system 210, primary director system 210 and one secondary director system 220 or 230, or primary director system 210 and any number of secondary director systems. In other embodiments, primary director system 210 may be inactive, and one of secondary director systems 220 or 230 may adapt to the role of primary director system 210, as discussed in greater detail herein. Primary director system 210 and secondary director systems 220 and 230 may be connected to each other through a network such as a Wide Area Network (WAN) or a Local Area Network (LAN). As shown in FIG. 2, decision managers 212, 222, and 232 may be directly connected by any appropriate means.

As will be appreciated by one skilled in the art, the components of director cluster 200 may be arranged in various ways and implemented with any suitable combination of hardware, firmware, and/or software, as applicable. For example, as compared to the depiction in FIG. 2, director cluster 200 may include a larger or smaller number of director systems, decision managers, sensors, or user interfaces. In addition, director cluster 200 may further include other components or devices not depicted that perform or assist in the performance of one or more processes, consistent with the disclosed embodiments. The exemplary components and arrangements shown in FIG. 2 are not intended to limit the disclosed embodiments.

Primary director system 210 may include one or more memory units and one or more processors, as discussed in greater detail herein. Primary director system 210 may include primary decision manager 212, which may include programs or pieces of software (e.g., modules, code, scripts, or functions) designed and written to process data and perform a particular task or set of tasks to fulfill a particular purpose. For example, primary decision manager 212 may be configured to manage an application (e.g., application 114 of FIG. 1) by triggering a failover process if the application becomes unavailable. Primary decision manager 212 may be configured to perform a task in response to a triggering event. For example, in response to a triggering event such as a consecutive number of 'DOWN' statuses associated with an application, primary decision manager 212 may be configured to initiate a failover protocol. As another example, in response to a triggering event such as the receipt of input data from any component of director cluster 200 or system 100 of FIG. 1, a user, or any other entity, primary decision manager 212 may be configured to process the input data and forward processed data to another director cluster 200 or system 100 component. Primary decision manager 212 may be connected to one or more networks and/or may be connected directly to secondary decision managers 222 and 232 and any other component of system 100 or director cluster 200.

Primary decision manager 212 may include primary sensors 214, which may be software (e.g., modules, code, scripts, or functions) or hardware configured to detect or measure a status associated with an application, object, or entity and transmit a resulting signal corresponding to their findings. For example, primary sensors 214 may be configured to determine the health of an application and report their findings to primary decision manager 212. In particular, primary sensors 214 may be configured to poll probe systems 112 or 122 of FIG. 1 to determine the health of application 114 or 124, respectively, and report their findings to primary decision manager 212. Primary sensors 214 may be connected to one or more networks and/or may be connected directly to probe systems 112 and 122 and any other component of system 100 or director cluster 200.

Primary decision manager 212 may include primary user interface 216, which may be software (e.g., modules, code, scripts, or functions) and/or hardware configured to allow a user and a computer system to interact. For example, primary user interface 216 may be configured to display, on a physical or virtual display, elements to a user which allow the user to make selections regarding one or more components of system 100 of FIG. 1 or director cluster 200. Primary user interface 216 may be connected to one or more networks and/or may be connected directly to one or more components of system 100 or director cluster 200. Primary user interface 216 is described in greater detail below.

Secondary director systems 220 and 230 may include one or more memory units and one or more processors, as discussed in greater detail herein. Secondary director systems 220 and 230 may include secondary decision managers 222 and 232, which may be similar to primary decision manager 212 and may be configured to perform similar functions. Additionally, secondary decision managers 222 and 232 may be configured to adapt to the role of primary decision manager 212, as discussed in greater detail below with respect to FIG. 8. Secondary decision managers 222 and 232 may be connected to one or more networks and/or may be connected directly to each other, primary decision manager 212, and any other component of system 100 or director cluster 200.

Secondary director systems 220 and 230 may include secondary sensors 224 and 234, which may be similar to primary sensors 214 and may be configured to perform similar functions. Secondary sensors 224 and 234 may be connected to one or more networks and/or may be connected directly to probe systems 112 and 122 of FIG. 1 and any other component of system 100 or director cluster 200.

Secondary director systems 220 and 230 may include secondary user interfaces 226 and 236, which may be similar to primary user interface 216 and may be configured to perform similar functions. Additionally, secondary user interfaces may be configured to adapt to the role of primary user interface 216. Secondary user interfaces 226 and 236 may be connected to one or more networks and/or may be connected directly to one or more components of system 100 or director cluster 200.

Figure 3:
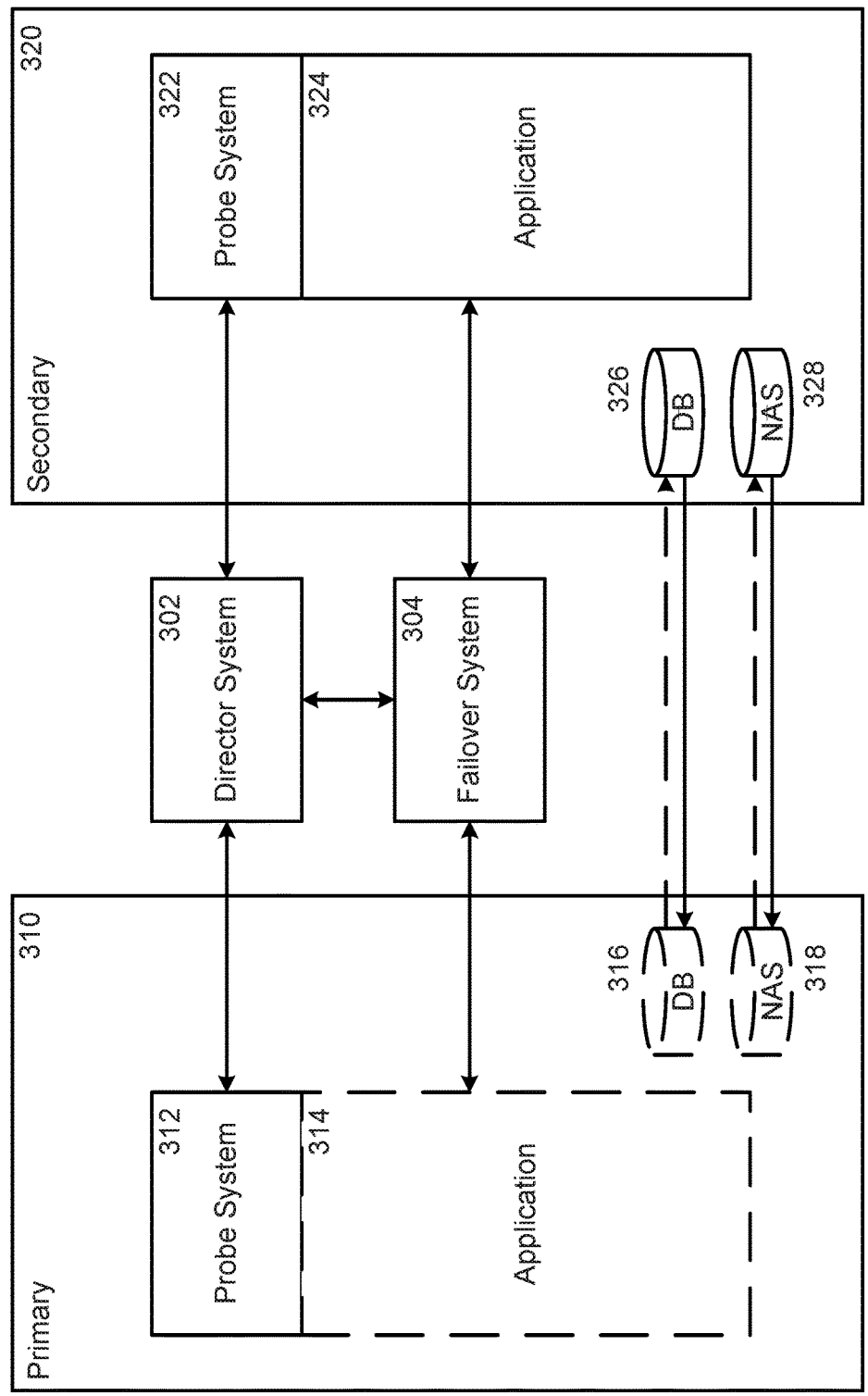
FIG. 3 is a diagram of an exemplary system for application management which has undergone a failover process, consistent with disclosed embodiments.

FIG. 3 is a diagram of an exemplary system 300 for managing an application 324 which has undergone a failover process, consistent with disclosed embodiments. System 300 may include a director system 302, a failover system 304, a primary local network 310, a primary probe system 312, a primary application 314, a primary database (DB) 316, a primary network-attached storage (NAS) 318, a secondary local network 320, a secondary probe system 322, a secondary application 324, a secondary DB 326, and a secondary NAS 328. The components of system 300 are similar to each corresponding component of system 100 of FIG. 1 and will not be described further with respect to FIG. 3.

As will be appreciated by one skilled in the art, the components of system 300 may be arranged in various ways and implemented with any suitable combination of hardware, firmware, and/or software, as applicable. For example, as compared to the depiction in FIG. 3, system 300 may include a larger or smaller number of director systems, failover systems, probe systems, applications, databases, network-attached storages, or networks. In addition, system 300 may further include other components or devices not depicted that perform or assist in the performance of one or more processes, consistent with the disclosed embodiments. The exemplary components and arrangements shown in FIG. 3 are not intended to limit the disclosed embodiments.

As shown in FIG. 3, system 300 has undergone a failover process, causing secondary application 324, secondary DB 326, and secondary NAS 328 to become active, while primary application 314, primary DB 316, and primary NAS 318 become inactive. Conceivably, primary application 114 of FIG. 1 may have become unavailable, causing director system 102 to trigger a failover process by, for example, instructing failover system 104 to perform the failover process. In some embodiments, the failover process may involve shutting down primary local network 110, primary application 114, primary DB 116, and/or primary NAS 118; bringing up secondary local network 120, secondary application 124, secondary DB 126, and/or secondary NAS 128; and switching traffic to secondary local network 120, application 124, secondary DB 126, and/or secondary NAS 128, causing system 100 to become system 300. For example, if primary probe system 312 runs a query against primary DB 316, primary probe system 312 may determine that primary application 314 is unavailable, and thus may be associated with a status of 'DOWN.' As another example, if secondary probe system 322 runs a query against secondary DB 326, secondary probe system 322 may determine that secondary application 324 is available, and thus may be associated with a status of 'UP.'

In some embodiments, secondary DB 326 may now be active and may replicate its data onto primary DB 316 by any appropriate process. In some embodiments, secondary NAS 328 may now be active and may replicate its data onto primary NAS 318 by any appropriate process. In such embodiments, one or more components of system 300 (e.g., director system 302, failover system 304, or applications 314 and 324) may ensure that primary DB 316 contains an up-to-date copy of the data in secondary DB 326 and primary NAS 318 contains an up-to-date copy of the data in secondary NAS 328.

FIG. 4 is a diagram of a user interface 400 for managing one or more applications, consistent with disclosed embodiments. User interface 400 may include table 402 containing rows 404a-h corresponding to applications and columns 406a-h corresponding to data associated with the applications. For example, rows 404a-g may correspond to Applications A-G and row 404h may describe the data contained in each column of table 402, column 406a may indicate the name of an application, column 406b may indicate the primary director system associated with an application and whether it is active, column 406c may indicate the secondary director system associated with an application and whether it is active, column 406d may indicate maintenance times for an application during which an automatic failover process should not be engaged, column 406e may indicate the status of an application, column 404f may indicate whether a user has selected to enable the automatic failover process, column 406g may indicate whether there is an alert associated with an application, and column 406h may allow a user to click on a director system to trigger a failover process and switch traffic from a primary application (e.g., primary application 114 of FIG. 1) to a secondary application (e.g., secondary application 124).

As will be appreciated by one skilled in the art, the components of user interface 400 may be arranged in various ways and implemented with any suitable combination of hardware, firmware, and/or software, as applicable. For example, as compared to the depiction in FIG. 4, user interface 400 may include a larger or smaller number of rows or columns, allowing for a larger or smaller number of applications or amount of data associated with the applications. For instance, user interface 400 may include an additional 'Secondary Director' column to allow for a director cluster with three director systems, such as director cluster 200 of FIG. 2. In addition, user interface 400 may further include other components not depicted that perform or assist in the performance of one or more processes, consistent with the disclosed embodiments. The exemplary components and arrangements shown in FIG. 4 are not intended to limit the disclosed embodiments.

As an example, 'Application A' corresponding to row 404a may have an inactive primary director system 'X,' an active secondary director system 'Y,' maintenance scheduled for Sunday from 02:00-06:00, a status of 'UP,' user-enabled the automatic failover process, an outstanding alert, and the option to trigger a failover process to activate primary director system 'X.' As another example, 'Application G' corresponding to row 402g may have an inactive primary director system 'X,' an inactive secondary director system 'Z,' maintenance scheduled for Sunday from 02:00-06:00, a status of 'DOWN,' user-disabled the automatic failover process, no outstanding alerts, and the option to trigger a failover process to activate primary director system 'X' or secondary director system 'Z.'

In some embodiments, visual indications may be utilized in columns 406b and 406c to specify which, if any, of the director systems is currently active. For example, an active or inactive director system may be specified by way of different colors, shading, text, or by any other means which may convey to a user whether a director system is active. In some embodiments, a user may be able to click on a cell or data contained within a cell associated with a primary or secondary director system of an application to activate the clicked primary or secondary director system. In other embodiments, clicking on or hovering over a cell or data contained within a cell associated with a primary or secondary director system of an application may reveal information related to the clicked primary or secondary director system. In some embodiments, columns 406b and 406c may be updated automatically by a suitable component of system 100 of FIG. 1 or director cluster 200 of FIG. 2, or may be modified by a user to, for example, swap the primary or secondary director systems for a different director system.

In some embodiments, the maintenance time specified in column 406d indicates a period of time during which the automatic failover process, should it be enabled, will not be engaged. In some embodiments, column 406e, relating to the status of an application, may be updated by one or more of probe systems 112 and 122, director system 102, or any other suitable component of system 100 of FIG. 1. In some embodiments, column 406f may allow a user to enable the automatic failover process by, for example, clicking on or sliding a slider one way or another. For example, the automatic failover process may be enabled for rows 404a-b and 404d, while manual failover may be required for rows 404c and 404e-g. The automatic failover process will be discussed in greater detail below with respect to FIG. 6.

In some embodiments, the data contained in the cells of column 406g may merely indicate, in binary form, whether there is an alert associated with an application. In other embodiments, different types of alerts may be indicated by way of visual indications, such as different colors, shapes, sizes, or any other appropriate visual cues. In some embodiments, the alert may be retrieved by clicking on, hovering over, or activating in any appropriate manner, an element or data contained within a cell of column 406g. Additionally or alternatively, a part of or all of the alert may itself be contained within the cells of column 406g. In the example of FIG. 4, there may be an outstanding alert associated with Applications A and C-E, for example, to alert of an issue with director system 'Y.'

By way of example, column 406h may allow a user to click on a director system to trigger a failover process and switch traffic from a primary application to a secondary application, as discussed above. For example, for 'Application A,' a user may click on or otherwise select primary director system 'X' to trigger a failover process and switch traffic from secondary director 'Y' to primary director system 'X.' In some embodiments, columns 406d, 406f, and 406h may be modified or updated by a user or automatically by a suitable component of system 100 of FIG. 1 or director cluster 200 of FIG. 2. In some examples, user interface 400 may include other features that a user may interact with, such as options to sort, filter, search, or otherwise modify table 402, generate a report with all or a part of the data contained in table 402, view historical data (e.g., total number of failovers executed), view or generate statistics, view an audit trail indicating a chronological record of the sequence of activities performed on user interface 400, determine which components of an application stack are to undergo the failover process or any other appropriate function which may be useful to a user using user interface 400.

Figure 5:
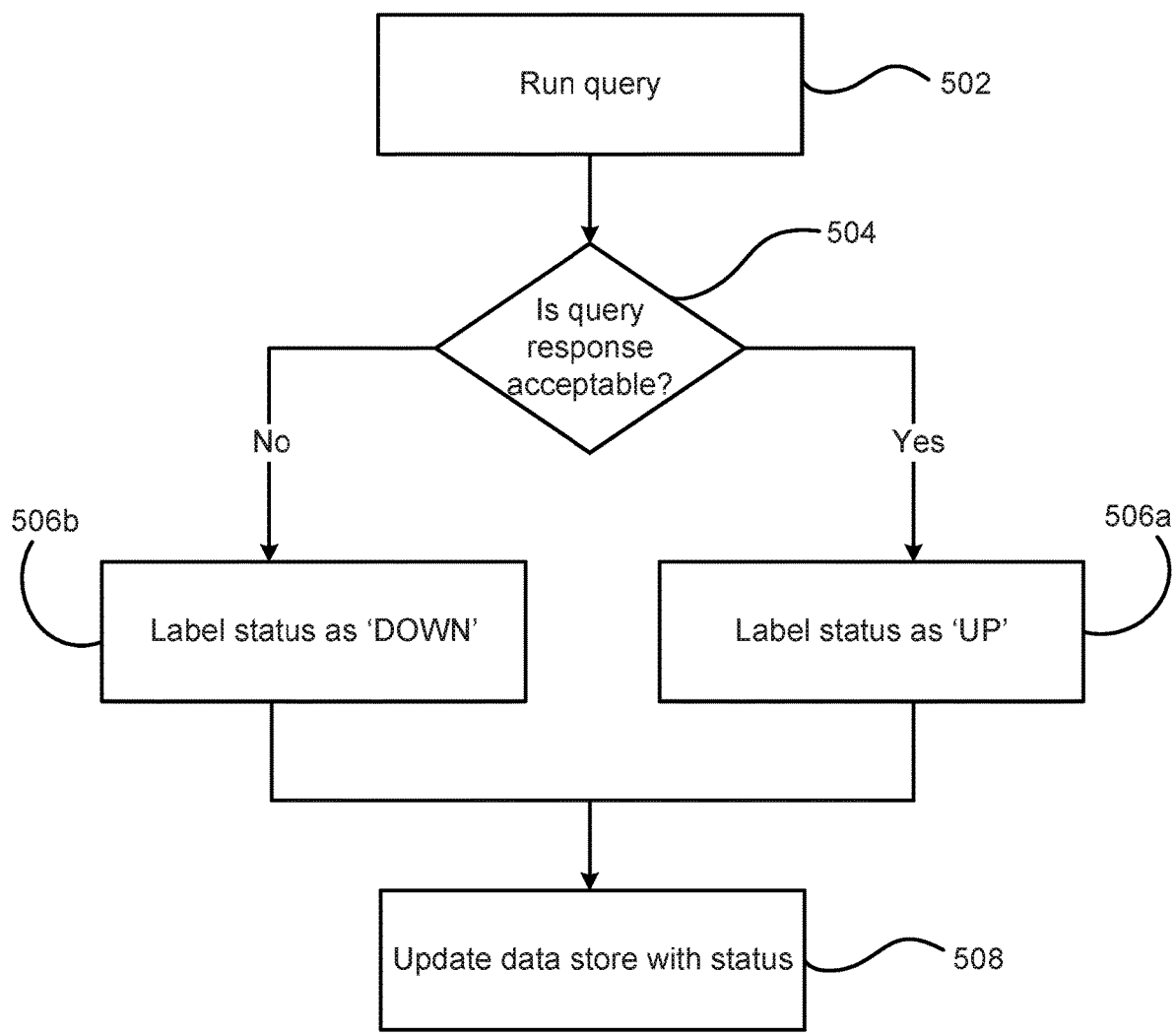
FIG. 5 is a flowchart of an exemplary method for monitoring the availability of an application, consistent with disclosed embodiments.

FIG. 5 is a flowchart of exemplary method 500 for monitoring the availability of an application, consistent with disclosed embodiments. In some embodiments, method 500 may be performed by a component of system 100 of FIG. 1, for example, one of probe systems 112 or 122 or director system 102. Method 500 is described below with reference to the networked systems of FIG. 1, but any other configuration of systems, subsystems, or modules may be used to perform method 500.

At step 502, probe system 112 may run a query against database 116. In some embodiments, probe system 112 may send a request for the query to application 114. A load balancer of application 114 may transmit the request to a web server of application 114, which in turn may transmit the request to an application server of application 114, which may then run the query against database 116. The response which probe system 112 expects may be a login webpage, a JSON file, a 200 response code, or any other suitable response which may indicate to probe system 112 whether application 114 and database 116 are available. In other embodiments, probe system 112 may connect directly to database 116. Probe system 112 may continuously run queries against database 116 or may run queries against database 116 in intervals, such as every minute.

At step 504, probe system 112 may determine whether the query response is acceptable. For example, if probe system 112 is successfully directed to a login webpage or receives a '200 OK' response code, probe system 112 may determine that the query response is acceptable and method 500 may proceed to step 506a. Alternatively, if probe system 112 does not receive an acceptable response, for example, there is no response or it is incomplete, such as being directed to a login webpage including an error, method 500 may proceed to step 506b.

At step 506a, probe system 112 may have determined that the query response is acceptable, and may label a status associated with application 114 as 'UP.' On the other hand, at step 506b, probe system 112 may have determined that the query response is not acceptable, and may label the status associated with application 114 as 'DOWN.'

At step 508, probe system 112 may update a data store associated with probe system 112 with the labeled status of 'UP' or 'DOWN,' depending on whether the response was acceptable or not, respectively. The data store may be a database which is connected to one or more networks of system 100 and, as such, director system 102 may access. In other embodiments, the data store is a webpage which director system 102 may access through an Internet connection. In yet other embodiments, the data store may be any repository for storing data which may include a file, email, document, database, webpage, spreadsheet, message queue, or any other suitable method for storing data which may be accessed by director system 102.

Figure 6:
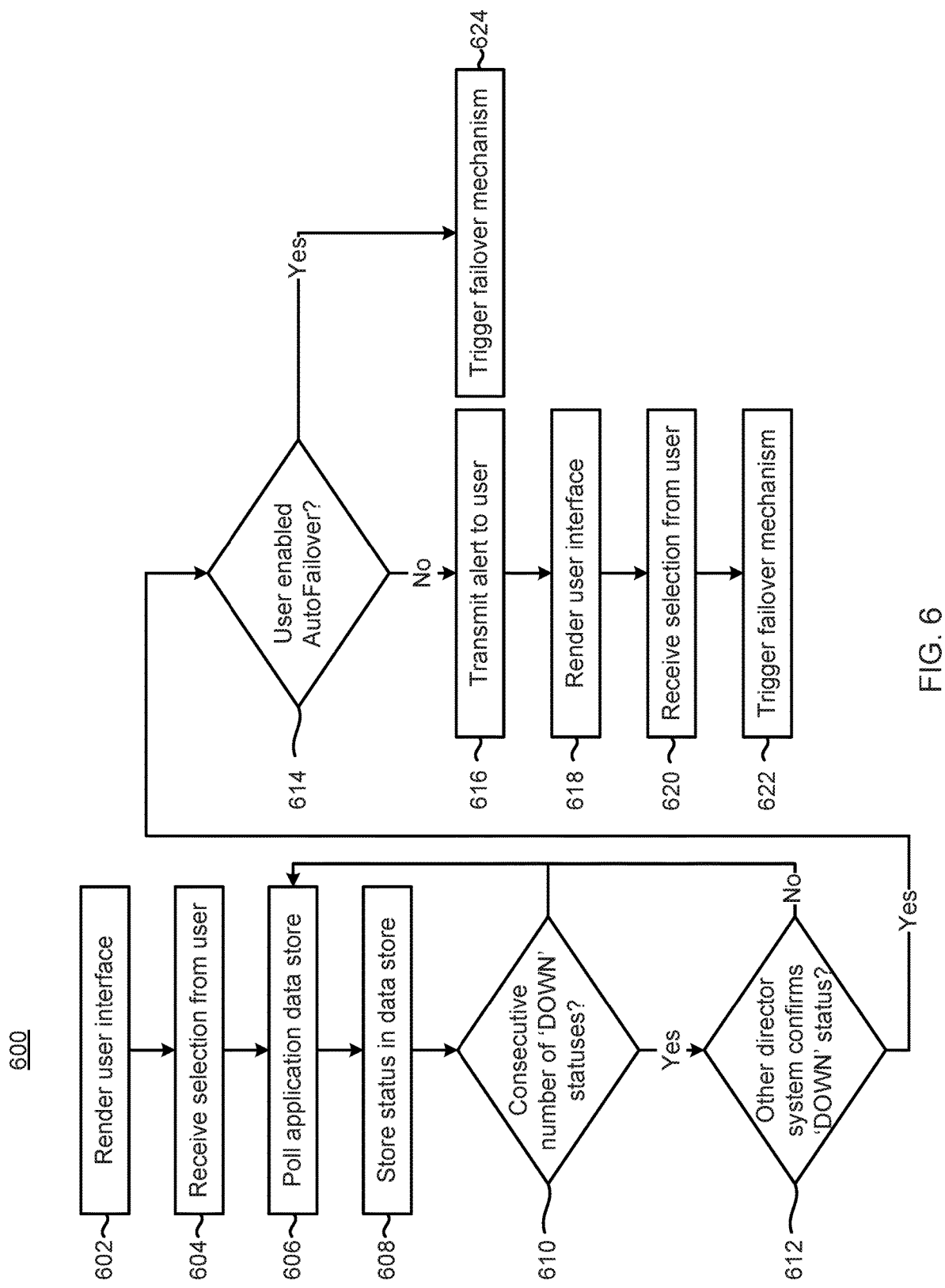
FIG. 6 is a flowchart of an exemplary method for application management, consistent with disclosed embodiments.

FIG. 6 is a flowchart of exemplary method 600 for application management, consistent with disclosed embodiments. In some embodiments, method 600 may be performed by a component of system 100 of FIG. 1 and/or director cluster 200 of FIG. 2, for example, primary director system 210. Method 600 is described below with reference to the networked systems of FIGS. 1 and 2, but any other configuration of systems, subsystems, or modules may be used to perform method 600.

At step 602, primary director system 210 may render a user interface (e.g., user interface 400 of FIG. 4) on a display such that a user may interact with the user interface. The display may include an electronic device or part of an electronic device which serves for the visual presentation of data. At step 604, primary director system 210 may receive a selection from the user indicating whether the automatic failover process is to be enabled for application 114. The selection may include an activation of an element of a cell of column 406f associated with application 114.

At step 606, primary director system 210 may poll the probe data store of probe system 112 in intervals to retrieve the status of application 114. Polling the probe data store may include accessing a web page or database, receiving a file or an email, or any suitable method by which primary director system 210 may retrieve the status of application 114 via a data store. In other embodiments, primary director system 210 may determine the status of application 114 by polling application 114 directly. Polling the probe data store or application 114 in intervals may refer to polling the probe data store or application 114 once every 'X' amount of time. For example, director system 210 may poll the data store or application 114 once every minute. The interval time may be set by a user, for example, via user interface 400, automatically determined by primary director system 210, or predetermined by a manufacturer. At step 608, primary director system 210 may store the retrieved status in a data store with an associated timestamp. A timestamp may be a digital record of the time at which the status was retrieved.

At step 610, primary director system 210 may determine whether the second data store includes a particular number of consecutive 'DOWN' statuses, the consecutive 'DOWN' statuses being the latest statuses to have been retrieved from the probe data store or application 114. For example, if the particular number is 5, primary director system 210 may determine the second data store includes the particular number of consecutive 'DOWN' statuses upon retrieving and/or storing 5 successive 'DOWN' statuses. If primary director system 210 determines that the second data store does include the particular number of consecutive 'DOWN' statuses, method 600 may proceed to step 612. Alternatively, method 600 may return to step 606 to continue polling the probe data store in intervals.

At step 612, primary director system 210 may engage in a handshake procedure with one or more of secondary director systems 220 and/or 230 to determine whether the one or more of secondary director systems 220 and/or 230 confirm that a particular number of consecutive 'DOWN' statuses for application 114 has been reached. The handshake procedure may be an automated process of an exchange of information between one or more director systems. For example, primary director system 210 may communicate with secondary director system 220 to determine whether secondary director system 220 has determined that application 114 is unavailable. This may prevent primary director system 210 from triggering a failover process for application 114 if the problem only exists in the connection between primary director system 210 and probe system 112 and secondary director systems 220 and/or 230 do not consider application 114 to be unavailable. If primary director system 210 determines that the one or more of secondary director systems 220 and/or 230 confirm that the particular number of consecutive 'DOWN' statuses for application 114 have been reached, method 600 may proceed to step 614. Otherwise, primary director system 210 may not proceed with the failover process and may engage an error process, such as alerting a support team regarding a potential probe failure.

At step 614, primary director system 210 may determine whether the user has enabled the automatic failover process based on the user selection of step 604. The automatic failover process may refer to a piece of software (e.g., modules, code, scripts, or functions) which automatically triggers a failover process without requiring a user input following the determination that an application is unavailable. If primary director system 210 determines that the user has not enabled the automatic failover process, method 600 may proceed to step 616. Otherwise, method 600 may proceed to step 624, where primary director system 210 may trigger a failover process.

At step 616, primary director system 210 may transmit an alert to the user. The alert may take the form of an email, notification, update to column 406g of FIG. 4, or any other means of informing the user that application 114 is unavailable. At step 618, primary director system 210 may render the user interface automatically or as a result of the user attempting to access the user interface. At step 620, primary director system 210 may receive a selection from the user instructing primary director system 210 to trigger the failover process. At step 622, primary director system 210 may trigger the failover process by, for example, instructing failover system 104 to perform the failover process or by performing the failover process itself.

Method 600 may be adjusted to be performed in fewer than 'X' minutes to satisfy a 'X'-minute service level agreement (SLA). For example, method 600 may be performed in fewer than 15 minutes to satisfy a 15-minute SLA if primary director system 210 polls the probe data store every minute and the number of consecutive 'DOWN' statuses necessary to trigger the failover process is 5.

Figure 7:
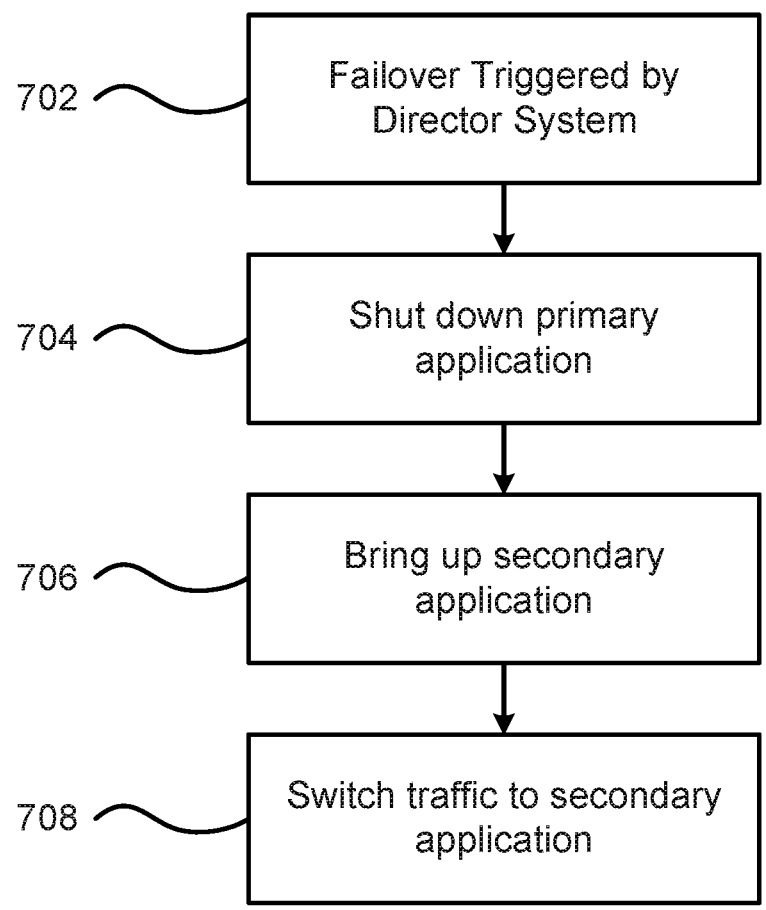
FIG. 7 is a flowchart of an exemplary method for performing a failover process, consistent with disclosed embodiments.

FIG. 7 is a flowchart of exemplary method 700 for performing a failover process, consistent with disclosed embodiments. In some embodiments, method 700 may be performed by a component of system 100 of FIG. 1 and/or director cluster 200 of FIG. 2, for example, failover system 104. Method 700 is described below with reference to the networked systems of FIGS. 1 and 2, but any other configuration of systems, subsystems, or modules may be used to perform method 700.

At step 702, primary director system 210 may trigger a failover process by, for example, instructing failover system 104 to perform the failover process.

At step 704, failover system 104 may shut down at least one of primary local network 110, primary application 114, primary DB 116, or primary NAS 118. Failover system 104 may terminate the connections by, for example, forcing local network 110, primary application 114, primary DB 116, or primary NAS 118 to go offline, creating a dynamic KILL statement for each connection, and/or altering the connections to have a single or restricted user.

At step 706, failover system 104 may bring up at least one of secondary local network 120, secondary application 124, secondary DB 126, or secondary NAS 128.

At step 708, failover system 104 may switch traffic to the at least one of secondary local network 120, secondary application 124, secondary DB 126, or secondary NAS 128 by reestablishing the connections from local network 110, primary application 114, primary DB 116, or primary NAS 118 to secondary local network 120, secondary application 124, secondary DB 126, or secondary NAS 128.

Figure 8:
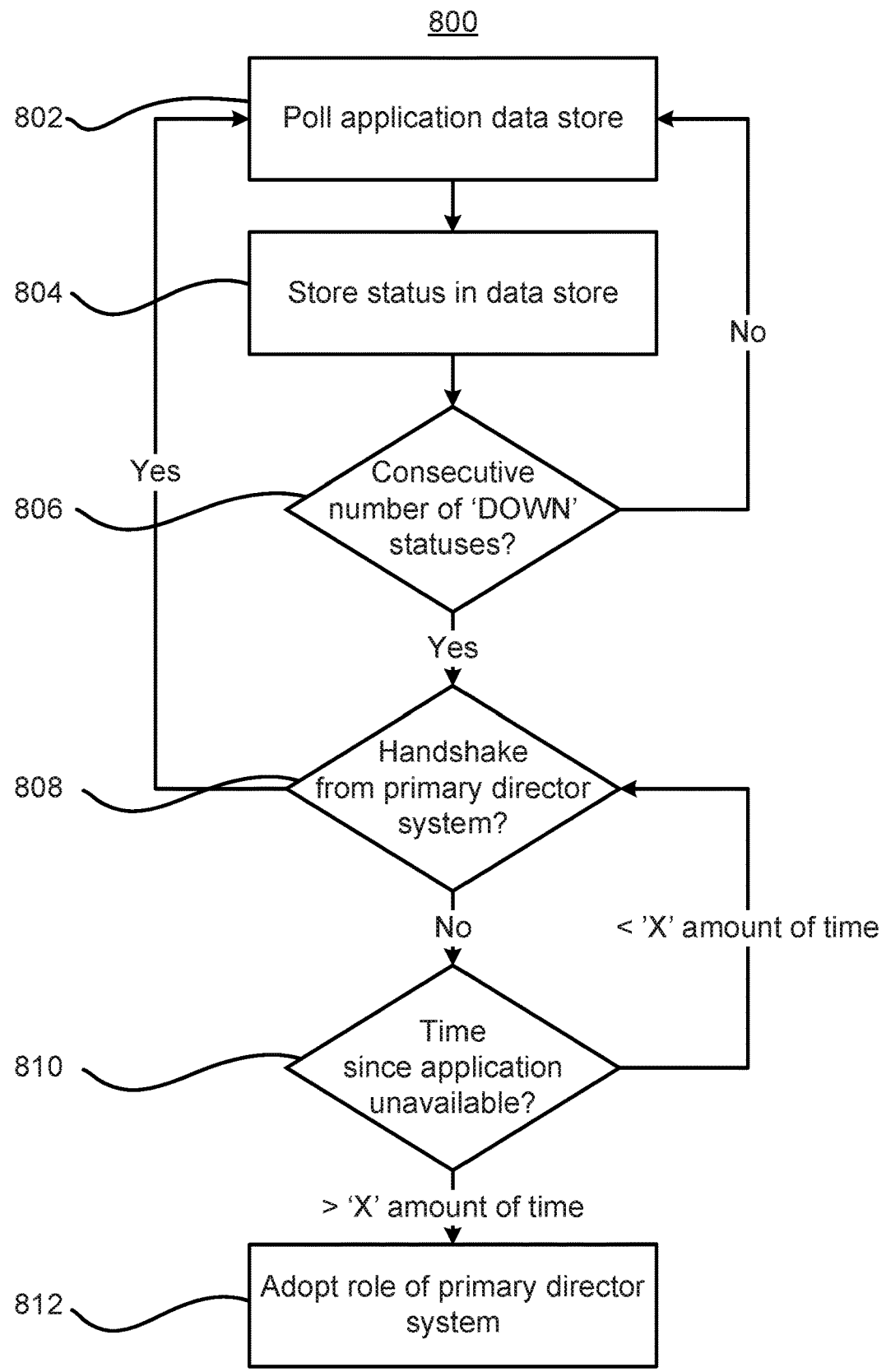
FIG. 8 is a flowchart of an exemplary method for adopting the role of a primary director system, consistent with disclosed embodiments.

FIG. 8 is a flowchart of exemplary method 800 for adopting the role of a primary director system, consistent with disclosed embodiments. In some embodiments, method 800 may be performed by a component of system 100 of FIG. 1 and/or director cluster 200 of FIG. 2, for example, one of secondary director systems 220 or 230. Method 800 is described below with reference to the networked systems of FIGS. 1 and 2, but any other configuration of systems, subsystems, or modules may be used to perform method 800.

At step 802, secondary director system 220 may poll the probe data store of method 500 of FIG. 5 in intervals to retrieve the status of application 114. Polling the probe data store may include accessing a web page or database, receiving a file or an email, or any suitable method by which secondary director system 220 may retrieve the status of application 114 via a data store. In other embodiments, secondary director system 220 may determine the status of application 114 directly. At step 804, secondary director system 220 may store the retrieved status in a data store with an associated timestamp.

At step 806, secondary director system 220 may determine whether the second data store includes a particular number of consecutive 'DOWN' statuses, the consecutive 'DOWN' statuses being the latest statuses to have been retrieved from the probe data store or application 114. If secondary director system 220 determines that the second data store does include the particular number of consecutive 'DOWN' statuses, method 800 may proceed to step 808. Alternatively, method 800 may return to step 802 to continue polling the probe data store or application 114 in intervals.

At step 808, secondary director system 220 may determine whether it has engaged in a handshake procedure with primary director system 210 to determine whether secondary director systems 220 confirms that a particular number of consecutive 'DOWN' statuses for application 114 has been reached. If secondary director system 220 determines that it has engaged in a handshake procedure with primary director system 210, then primary director system 210 is active and secondary director system 220 may remain inactive, returning to step 802 to once again poll the probe data store or application 114 in intervals. Otherwise, method 800 may proceed to step 810.

At step 810, secondary director system 220 may determine whether a certain amount of time has passed since it determined that application 114 was unavailable. For example, the certain amount of time may be 1 minute after retrieving and/or storing 5 consecutive 'DOWN' statuses. As another example, the certain amount of time may be 5 minutes since the first 'DOWN' status of the 5 consecutive 'DOWN' statuses was retrieved and/or stored. If secondary director system 220 determines that the certain amount of time has not passed, method 800 may return to step 808 to await the handshake from primary director system 210 until the certain amount of time has passed. Otherwise, method 800 may proceed to step 812.

At step 812, secondary director system 220 may adopt the role of primary director system 210, as primary director system 210 is assumed to be unavailable or inactive. Adopting the role of primary director system 210 may involve performing the steps of method 600 of FIG. 6 beginning at step 612.

Systems and methods disclosed herein involve unconventional improvements over conventional failover systems. As compared to conventional technologies, the disclosed embodiments may improve resilience, reaction time, flexibility, convenience, and compatibility.

Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A computer-implemented system for application management, the computer-implemented system comprising:
   a probe system comprising:
      at least one memory storing instructions; and
      one or more processors configured to execute the instructions to:
         monitor an availability of an application, and
         update a status associated with the availability of the application in a first data store; and
   one or more director systems comprising:
      a primary director system and one or more secondary director systems;
      at least one memory storing instructions; and
      one or more processors configured to execute the instructions to:
         polling, by the primary director system, the first data store in intervals to retrieve the status associated with the availability of the application at different times;
         upon retrieving at least a particular number of consecutive down statuses for the application being unavailable, determine, by the primary director system, whether at least one secondary director system of the one or more secondary director systems has also confirmed that the particular number of consecutive down statuses for the application being unavailable has been reached;
         upon determining that at least one secondary-director system of the one or more secondary director systems has also confirmed that the particular number of consecutive down statuses for the application being unavailable has been reached, trigger a failover process, wherein the failover process comprises:
            shutting down the application, wherein the shutting down further includes altering connections of the application such that the application is only connected to a single user,
            bringing up a secondary application,
            and switching traffic to the secondary application;
         upon determining that at least one secondary director system of the one or more secondary director systems has not confirmed that the particular number of consecutive down statuses associated with the application has been reached, engaging an error process, wherein the error process includes alerting a support team regarding a potential failure of the probe system;
         updating a user interface to display the status of the application based on the polling, the failover process, and the error process, wherein an available application is specified in an appearance different from an unavailable application; and
         generating a report, for display on the user interface, the report displaying historical data of the failover process, statistical data, and an audit trail of activities performed on the user interface.

2. The computer-implemented system of claim 1, the one or more processors of the one or more director systems further configured to execute the instructions to determine whether to automatically trigger the failover process based on a user input.

3. The computer-implemented system of claim 1, the one or more processors of the one or more director systems further configured to execute the instructions to:
   render the user interface; and
   receive a selection, from a user, associated with the application, the selection indicating whether the failover process it to be triggered automatically,
   upon the application being unavailable, or manually, requiring a user input.

4. The computer-implemented system of claim 1, the one or more processors of the one or more director systems further configured to execute the instructions to:
   transmit an alert to a user;
   render the user interface;
   receive a selection from the user; and
   determine whether to trigger the failover process based on the user selection.

5. The computer-implemented system of claim 1, wherein the primary director system is configured to trigger the failover process upon determining that the application is unavailable and that the at least one secondary director system of the one or more secondary director systems has also determined the application is unavailable.

6. The computer-implemented system of claim 1, wherein the one or more secondary director systems is configured to become a new primary director system upon:
   determining the application is unavailable;
   waiting for an amount of time; and
   failing to receive a signal from the primary director system.

7. The computer-implemented system of claim 6, wherein the new primary director system is configured to:
   determine the at least one secondary director system of the one or more secondary director systems has determined the application is unavailable; and
   trigger the failover process.

8. The computer-implemented system of claim 1, the one or more processors of the one or more director systems further configured to execute the instructions to monitor the availability of the application.

9. The computer-implemented system of claim 1, wherein the monitoring an availability of an application includes running a query against a database associated with the application.

10. The computer-implemented system of claim 1, the failover process comprising:
    shutting down at least one of the application, a database associated with the application, or a network associated with the application;
    bringing up at least one of a secondary application, a secondary database associated with the secondary application, or a secondary network associated with the secondary application; and
    switching traffic to the at least one of the secondary application, the secondary database associated with the secondary application, or the secondary network associated with the secondary application.

11. The computer-implemented system of claim 1, wherein the instructions are executed by the one or more director systems in fewer than 15 minutes.

12. The computer-implemented system of claim 1, wherein the primary director system poll the first data store in intervals of 1 minute.

13. The computer-implemented system of claim 1, wherein polling the first data store includes accessing a uniform resource locator (URL) associated with the application.

14. The computer-implemented system of claim 1, the one or more processors of the one or more director systems further configured to execute the instructions to store in, a second data store, the status associated with the availability of the application with an associated timestamp.

15. The computer-implemented system of claim 14, wherein determining the application is unavailable includes determining the second data store includes the at least the particular number of consecutive down statuses associated with the application being unavailable.

16. A computer-implemented method for application management, the computer-implemented method comprising:
    monitoring, by a probe system, an availability of an application and updating a status associated with the availability of the application in a first data store;
    polling, by a primary director system, the first data store in intervals to retrieve the status associated with the availability of the application at different times;
    upon retrieving at least a particular number of consecutive down statuses for the application being unavailable, determine, by the primary director system, whether at least one secondary director system of a one or more secondary director systems has also confirmed that the particular number of consecutive down statuses for the application being unavailable has been reached;
    upon determining that at least one secondary director system of the one or more secondary director systems has also confirmed that the particular number of consecutive down statuses for the application being unavailable has been reached, triggering a failover process, wherein the failover process comprises:
        shutting down the application, wherein the shutting down further includes altering connections of the application such that the application is only connected to a single user,
        bringing up a secondary application, and
        switching traffic to the secondary application;
    upon determining that at least one secondary director system of the one or more secondary director systems has not confirmed that the particular number of consecutive down statuses associated with the application has been reached, engaging an error process, wherein the error process includes alerting a support team regarding a potential failure of the probe system;
    updating a user interface to display the status of the application based on the polling, the failover process, and the error process, wherein an available application is specified in an appearance different from an unavailable application; and
    generating a report, for display on the user interface, the report displaying historical data of the failover process, statistical data, and an audit trail of activities performed on the user interface.

* * * * *